United States Patent
Somasundaram et al.

(10) Patent No.: US 9,913,206 B2
(45) Date of Patent: Mar. 6, 2018

(54) METHOD AND APPARATUS FOR SEARCHING FOR CLOSED SUBSCRIBER GROUP CELLS

(75) Inventors: Shankar Somasundaram, Deer Park, NY (US); Rajat P. Mukherjee, Stanford, CA (US); Mohammed Sammour, Alrabieh (JO); Jean-Louis Gauvreau, La Prairie (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 505 days.

(21) Appl. No.: 12/406,562

(22) Filed: Mar. 18, 2009

(65) Prior Publication Data

US 2009/0239533 A1    Sep. 24, 2009

Related U.S. Application Data (60) Provisional application No. 61/038,598, filed on Mar. 21, 2008, provisional application No. 61/057,544, filed on May 30, 2008.

(51) Int. Cl.
*H04W 4/00*  (2009.01)
*H04W 48/16* (2009.01)
(Continued)

(52) U.S. Cl.
CPC ......... *H04W 48/16* (2013.01); *H04J 11/0093* (2013.01); *H04W 84/045* (2013.01)

(58) Field of Classification Search
CPC .. H04J 11/0093; H04W 48/16; H04W 84/045
(Continued)

(56) References Cited

U.S. PATENT DOCUMENTS 7,738,922 B2    6/2010  Hashimoto et al.
8,014,376 B2    9/2011  Kim
(Continued)

FOREIGN PATENT DOCUMENTS

CN    101534529 A    9/2009
CN    101552954 A    10/2009
(Continued)

OTHER PUBLICATIONS

3GPP TS 36.300 V8.3.0 on Dec. 2007.*
(Continued)

*Primary Examiner* — Ayaz Sheikh
*Assistant Examiner* — Hai-Chang Hsiung
(74) *Attorney, Agent, or Firm* — Theodore Naccarella (57) ABSTRACT

A method and apparatus for searching for closed subscriber group (CSG) cells are described. A wireless transmit/receive unit (WTRU) transmits, to a network of CSG cells, a measurement/cell-search gap request message including a cause value having at least one bit that indicates whether the request message was transmitted due to a manual cell search command or a WTRU autonomous determination. The WTRU receives a measurement/cell-search gap allocation message from the network in response to the measurement/cell-search request message. The WTRU also may determine whether it has a discontinuous reception (DRX) gap that is long enough to read a master information block (MIB) and a system information block (SIB) of a neighboring CSG cell. If the DRX gap is not long enough, the WTRU may transmit a measurement/cell-search gap request message to the network, or autonomously tune away from a cell currently serving the WTRU to read the MIB and SIB.

22 Claims, 3 Drawing Sheets (51) Int. Cl.
H04J 11/00 (2006.01)
H04W 84/04 (2009.01)

(58) Field of Classification Search
USPC .......................................................... 370/328
See application file for complete search history.

(56) References Cited

U.S. PATENT DOCUMENTS

| | | | |
|---|---|---|---|
| 8,131,295 B2 | 3/2012 | Wang et al. | |
| 8,676,204 B2 | 3/2014 | Uemura et al. | |
| 2006/0111110 A1* | 5/2006 | Schwarz et al. | 455/439 |
| 2006/0226557 A1* | 10/2006 | Yamamoto | 257/794 |
| 2007/0097914 A1* | 5/2007 | Grilli et al. | 370/329 |
| 2009/0047968 A1* | 2/2009 | Gunnarsson et al. | 455/446 |
| 2009/0082020 A1* | 3/2009 | Ch'ng et al. | 455/435.3 |
| 2009/0135787 A1 | 5/2009 | Uemura et al. | |
| 2009/0168727 A1 | 7/2009 | Somasundaram et al. | |
| 2009/0176490 A1 | 7/2009 | Kazmi et al. | |
| 2009/0185524 A1 | 7/2009 | Sammour et al. | |
| 2009/0239533 A1 | 9/2009 | Somasundaram et al. | |
| 2009/0312023 A1* | 12/2009 | Kazmi | 455/436 |
| 2009/0316654 A1 | 12/2009 | Prakash et al. | |
| 2011/0092214 A1 | 4/2011 | Iwamura | |
| 2011/0096660 A1 | 4/2011 | Ikeda et al. | |
| 2011/0300867 A1 | 12/2011 | Matsuo et al. | |
| 2011/0314162 A1 | 12/2011 | Xu et al. | |
| 2014/0119270 A1 | 5/2014 | Zhang et al. | |

FOREIGN PATENT DOCUMENTS

| | | |
|---|---|---|
| JP | 2009-124671 A2 | 6/2009 |
| WO | 2007/006228 | 1/2007 |
| WO | 2007/103822 | 9/2007 |
| WO | 2008/002342 | 1/2008 |
| WO | WO-2008/023242 | 2/2008 |
| WO | 2008/027946 | 3/2008 |
| WO | 2009/044317 A2 | 4/2009 |
| WO | 2009/055841 A1 | 5/2009 |
| WO | WO-2009/088824 | 7/2009 |

OTHER PUBLICATIONS

Huawei, "Measurement Gap scheduling in HO procedure in LTE," 3GPP TSG RAN2 #52, R2-060860 (Mar. 27-31, 2006).
Motorola, "Identification and Measurement of CSG cells," 3GPP TSG-RAN WG2#61, R2-081114 (Feb. 11-15, 2008).
Qualcomm Europe, "Measurement gap scheduling," 3GPP TSG-RAN2 Meeting #50, R2-060058 (Jan. 9-13, 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.4.0, (Mar. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.7.0, (Dec. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.4.0, (Dec. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.1.0, (Mar. 2008).
Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.4.0, (Dec. 2008).
Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.1.0, (Mar. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.3.0, (Dec. 2007).
Nokia Corporation et al., "CSG Cell Identification for Mobility and Measurement Reporting," 3GPP TSG-RAN WG2 Meeting #59bis, R2-074882 (Nov. 5-9, 2007).
Motorola, "UMTSLTE: Inbound CSG Mobility LTE," R2-094632, 3GPP TSG-RAN WG2 #67, Shenzhen, China, Aug. 24-28, 2009.
Qualcomm, "UMTSLTE: Inbound CSG Mobility UMTS," R2-094820, 3GPP TSG-RAN WG2 #67, Shenzhen, China, Aug. 24-28, 2009.
Rapporteur Huawei, "Status Report for WI to TSG," TSG-RAN Meeting #45, Seville, Spain, Sep. 15-18, 2009.
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.1.0 (Mar. 2008).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.4.0 (Dec. 2008).
Third Generation Partnership Project, "Technical Specification Group Radio Access Network; Mobility Procedures for Home NodeB; Overall Description; Stage 2 (Release 8)," 3GPP TS 25.367 V8.0.0 (Dec. 2008).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.18.0 (Dec. 2007).
Third Generation Partnership Project, "Technical Specification Group Radio Access Network; Radio Resource Control (RRC); Protocol Specification (Release 5)," 3GPP TS 25.331 V5.21.0 (Dec. 2007).
Third Generation Partnership Project, "Technical Specification Group Radio Access Network; Radio Resource Control (RRC); Protocol Specification (Release 5)," 3GPP TS 25.331 V5.23.0 (Dec. 2008).
Third Generation Partnership Project, "Technical Specification Group Radio Access Network; Radio Resource Control (RRC); Protocol Specification (Release 6)," 3GPP TS 25.331 V6.16.0 (Dec. 2007).
Third Generation Partnership Project, "Technical Specification Group Radio Access Network; Radio Resource Control (RRC); Protocol Specification (Release 6)," 3GPP TS 25.331 V6.21.0 (Mar. 2009).
Third Generation Partnership Project, "Technical Specification Group Radio Access Network; Radio Resource Control (RRC); Protocol Specification (Release 7)," 3GPP TS 25.331 V7.7.0 (Dec. 2007).
Third Generation Partnership Project, "Technical Specification Group Radio Access Network; Radio Resource Control (RRC); Protocol Specification (Release 7)," 3GPP TS 25.331 V7.11.0 (Dec. 2008).
Third Generation Partnership Project, "Technical Specification Group Radio Access Network; Radio Resource Control (RRC); Protocol Specification (Release 8)," 3GPP TS 25.331 V8.1.0 (Dec. 2007).
Third Generation Partnership Project, "Technical Specification Group Radio Access Network; Radio Resource Control (RRC); Protocol Specification (Release 8)," 3GPP TS 25.331 V8.5.0 (Dec. 2008).
Third Generation Partnership Project, "Technical Specification Group Radio Access Network; User Equipment (UE) procedures in (56) References Cited

OTHER PUBLICATIONS idle mode and procedures for cell reselection in connected mode(Release 1999)," 3GPP TS 25.304 V3.14.0 (Mar. 2004).
Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).
Third Generation Partnership Project, "Technical Specification Group Radio Access Network; User Equipment (UE) procedures in idle mode and procedures for cell reselection in connected mode (Release 7)," 3GPP TS 25.304 V7.5.0 (Mar. 2008).
Third Generation Partnership Project, "Technical Specification Group Radio Access Network; User Equipment (UE) procedures in idle mode and procedures for cell reselection in connected mode (Release 7)," 3GPP TS 25.304 V7.7.0 (Sep. 2008).
Third Generation Partnership Project, "Technical Specification Group Radio Access Network; User Equipment (UE) procedures in idle mode and procedures for cell reselection in connected mode (Release 8)," 3GPP TS 25.304 V8.1.0 (Mar. 2008).
Third Generation Partnership Project, "Technical Specification Group Radio Access Network; User Equipment (UE) procedures in idle mode and procedures for cell reselection in connected mode (Release 8)," 3GPP TS 25.304 V8.4.0 (Dec. 2008).
Ericsson, "Automatic neighbour cell configuration," 3GPP TSG RAN WG3 Meeting #57, R3-071494, Athens, Greece (Aug. 20-24, 2007).
Ericsson, "Inter-RAT/Frequency Automatic Neighbor Relation Measurements," 3GPP TSG-RAN WG3 Meeting #59, R3-080420, Sorrento, Italy (Feb. 11-15, 2008).
Motorola, "Physical Layer Identity of CSG Cells," 3GPP TSG-RAN WG2 Meeting #60, R2-075088, Jeju, Korea (Nov. 5-9, 2007).
Nokia Siemens Networks et al., "Home eNodeB mobility call flows (redux R3-080373)," 3GPP TSG RAN WG3 Meeting #59 bis, R3-080815, Sorrento, Italy (Feb. 11-15, 2008).
Samsung, "Measurement of home & private eNBs," 3GPP TSG-RAN2 Meeting #59, R2-073307, Athens, Greece (Aug. 20-24, 2007).
Vodafone Group, "Measurement Control in LTE_ACTIVE state (for CSG Cells)," 3GPP TSG RAN WG2#58bis, R2-072829, Orlando, Florida, USA (Jun. 25-29, 2007).
"Russian Office Action", Russian Application No. 2010143036, Mar. 23, 2012, 6 pages.

\* cited by examiner

METHOD AND APPARATUS FOR SEARCHING FOR CLOSED SUBSCRIBER GROUP CELLS

CROSS REFERENCE TO RELATED APPLICATIONS

This application claims the benefit of U.S. Provisional Application No. 61/038,598 filed Mar. 21, 2008 and U.S. Provisional Application No. 61/057,544 filed May 30, 2008, which are incorporated by reference as if fully set forth.

FIELD OF INVENTION

This application is related to wireless communications.

BACKGROUND

Current efforts for third generation partnership project (3GPP) long term evolution (LTE) systems are to update the technology, architecture and methods in the new LTE settings and configurations. These efforts would improve spectral efficiency, reduce latency, and improve radio resource utilization in order to provide faster user data rates and richer applications and services with less cost.

As part of these efforts, the 3GPP is proposing to introduce the concept of a home evolved Node-B (HeNB) in LTE systems, and in a parallel fashion, HeNBs may be introduced in Release 8 wideband code division multiple access (WCDMA), global system for mobile communications (GSM) enhanced data rates for GSM evolution (EDGE) radio access networks (GERANs) and other cellular standards. The HeNB refers to a physical device that may be similar to a wireless local area network (WLAN) access point (AP), which may be designed in a manner that allows access to cellular services to users over extremely small service areas, (e.g., homes or small offices). This can be particularly useful in areas where cellular networks have not been deployed and/or legacy RAT coverage exists, and in areas where cellular coverage may be faint or non-existent for radio related reasons, (e.g., an underground metro or shopping mall). The subscriber, (e.g., an individual or an organization), can deploy a HeNB over an area where such service is desired.

The HeNB is intended to connect to an operator's core network by using, for example, public internet connections available freely in homes and businesses across the country made available, for example, by direct subscriber line (DSL). This can be particularly useful in areas where LTE has not been deployed, and/or legacy 3GPP radio access technology (RAT) coverage already exists. This may also be useful in areas where LTE coverage may be faint or non-existent as a result of radio transmission problems that occur while being in an underground metro or a shopping mall, for example. The cell, which is the area of radio coverage provided by the HeNB, that is deployed by the HeNB may be accessed only by a group of subscribers who have access to the services of the cell, known as a family, and such a cell may be referred to as a HeNB cell or, more commonly, a closed subscriber group (CSG) cell. An HeNB may be used to deploy one or more CSG cells over the area that LTE coverage is desired. A CSG cell is a cell deployed by either an HeNB for LTE services, or by a home Node-B (HNB) for WCDMA or other legacy 3GPP RAT systems. A WTRU subscriber, (associated with an individual or an organization), may deploy a CSG cell, (listed on a white accessible to the WTRU subscriber), using an HeNB over an area where LTE service is desired. On the other hand, a macro-cell may be accessed by any WTRU that is not barred.

It has been proposed that a wireless transmit/receive unit (WTRU), as part of its white-list configuration, also be configured with the physical layer cell identifiers (PCIDs) of the CSG cells to which it has access. These PCIDs may correspond to any combination of the primary synchronization channel (P-SCH) and the secondary synchronization channel (S-SCH), or some other form of physical (PHY) layer identification for the CSG cells. It has also been proposed that a WTRU be able to request that a measurement/cell-search gap be allocated to it for CSG cell measurements/search, whereby this request may be triggered by a manual CSG cell search initiation. This measurement gap represents a point in time when the WTRU is tuned away from the serving cell such that it can search for suitable CSG cells in the vicinity.

Currently, it has been proposed that the WTRU read the master information block (MIB) and system information block (SIB) of the CSG cells in connected mode to decide if the upper-layer identity of the CSG cell, (e.g., the global cell identity of the CSG cell), is part of its white list. Furthermore, it has been proposed that the WTRU may tune away autonomously creating its own measurement gap, allowing it to read the SIB of the neighboring CSG cells.

However, several problems exist that need to be solved. For example, it has not been clearly established under what criteria the WTRU should use to autonomously tune away from the serving cell and read the CSG cell SIBs. Furthermore, it is not clear whether the WTRU generates continuous measurement gaps or disjoint measurement gaps, and if any indication needs to be sent by the WTRU when it autonomously tunes away from its serving evolved Node-B (eNB) or cell. Additionally, it is not clear whether the WTRU should report to the network that it has just detected a CSG cell or whether it has read and confirm the upper-layer identity.

While some tentative solutions have been proposed for active mode mobility between LTE macro-cells and CSG cells, no comprehensive solution incorporating different types of mobility has been developed as yet. Thus, a procedure that addresses the problems described above is desired, keeping in mind the restrictions imposed by the standardization bodies. It would therefore be beneficial to provide a method and apparatus for providing HeNB services to WTRUs.

A method and apparatus are proposed that provide a mechanism for a WTRU to measure and report CSG cells. Specifically, it proposes mechanisms that allow a WTRU to minimize the time taken to identify the CSG cell to which it has access.

SUMMARY

A method and apparatus for searching for CSG cells are described. A WTRU transmits, to a network of CSG cells, a measurement/cell-search gap request message including a cause value having at least one bit that indicates whether the request message was transmitted due to a manual cell search command or a WTRU autonomous determination. The WTRU receives a measurement/cell-search gap allocation message from the network in response to the measurement/cell-search request message. The WTRU also may determine whether it has a discontinuous reception (DRX) gap that is long enough to read an MIB and SIB of a neighboring CSG cell. If the DRX gap is not long enough, the WTRU may transmit a measurement/cell-search gap request message to the network, or autonomously tune away from a cell currently serving the WTRU to read the MIB and SIB.

A WTRU is preferably configured with frequency information of the CSG cells to which it has access and stores the frequency information in memory, such as a universal integrated circuit card (UICC), a universal subscriber identity module (USIM) or in the WTRU. The frequency information may be configured in the WTRU using the same message that configures the WTRU with the white-list of CSG IDs (identifiers), (e.g., a CSG tracking area (TA) ID), corresponding to the CSG cells to which the WTRU has access, or in a separate message. The frequency information may be the frequency band in which CSG cells are deployed. Additionally, or as an alternative, the frequency information may be the center frequency of the CSG cell to which the WTRU receiver will synchronize.

A WTRU may be configured with the PCIDs of the CSG cells to which it has access using the same message that configures the WTRU with the white-list of CSG identifiers or in a separate message. Procedures are disclosed for requesting measurement/cell-search gap and handover allocations by the WTRU, and for handling measurement/cell-search gap allocation or handover allocation refusal for WTRUs in active and idle modes.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

When referred to hereafter, the terminology "closed subscriber group (CSG) cell" includes but is not limited to an HeNB, or an HNB.

Although the teachings herein refer to LTE CSG cells, the teachings herein may be applied to CSG cells in any RAT network including, for example, WCDMA and GERAN communications systems.

Active Mode Mobility

Figure 1:
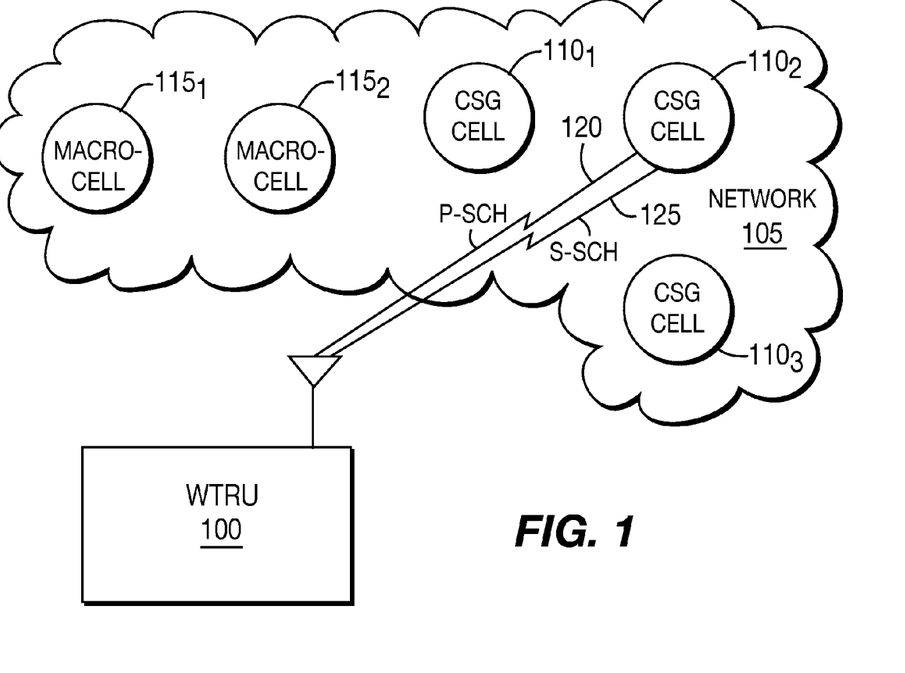
FIG. 1 shows a wireless communication system including a WTRU and a network including a plurality of CSG cells and macro-cells.

FIG. 1 shows a wireless communication system 10 including a WTRU 100 and a network 105 including a plurality of CSG cells $110_1$, $110_2$ and $110_3$ and macro-cells 1151 and 1152. The CSG cells $110_1$, $110_2$ and $110_3$ have PCIDs that may correspond to any combination of a P-SCH 120 and an S-SCH 125.

Figure 2:
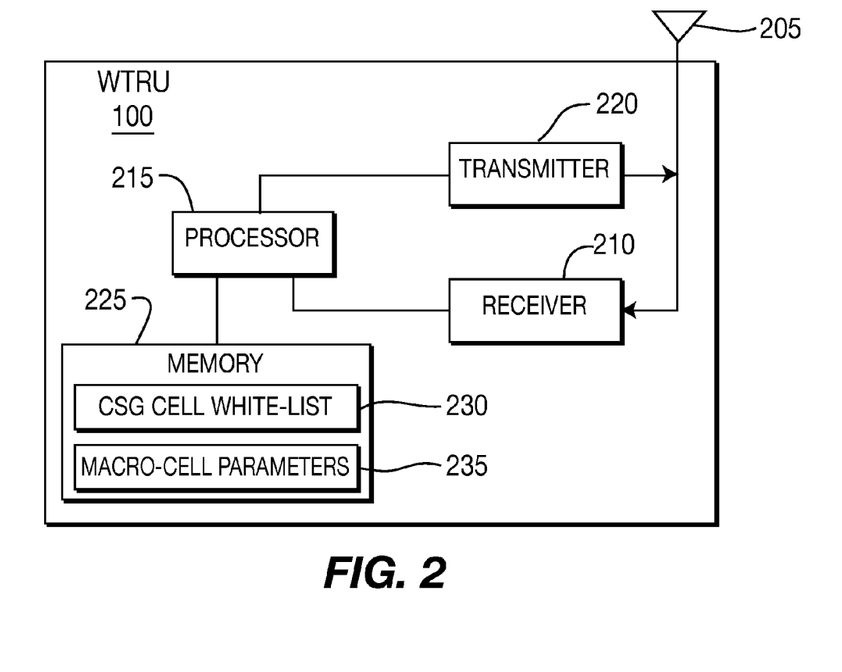
FIG. 2 is an exemplary block diagram of the WTRU used in the wireless communication system of FIG. 1.

FIG. 2 is an exemplary block diagram of the WTRU 100 used in the wireless communication system 10. The WTRU 100 may include an antenna 205, a receiver 210, a processor 215, a transmitter 220 and a memory 225. The memory 225 may include a CSG cell white-list 230 and macro-cell parameters 235. Alternatively, the CSG cell white-list 230 may be accessed by the WTRU 100 from an outside source, such as the network 105 and/or at least one of the CSG cells 110 therein.

A request for a measurement/cell-search gap to be allocated to the WTRU 100 for CSG cell measurements/search may be triggered by the WTRU 100 autonomously determining existing neighboring CSG cells $110_1$, $110_2$ and $110_3$ through the use of neighbor cell relations or global positions systems (GPS), or by use of some other algorithm. The request for a measurement/search gap may include a cause value for the request, such as a manual cell search command or a WTRU autonomous search request.

The message requesting a measurement/search gap may have a one-bit indicator that indicates to a network 105, that includes at least one CSG cell 110, whether the request was due to a manual cell search command or a WTRU autonomous determination. The request for a measurement/search gap may be carried in a dedicated radio resource control (RRC) message, or as part of any other RRC message, (e.g., a measurement report). Alternatively, the request may be carried in a new RRC message, (i.e., an RRC event notification message), for reporting a variety of WTRU related events including, but not limited to, CSG manual search initiation, mobile-originated (MO) voice call, and MO voice call in the circuit-switched (CS) domain. The requests for a measurement gap and a cell-search gap may be indicated separately, using different messages, or using a single message.

In addition, or alternatively, the request for a measurement/cell-search gap may contain an indication of whether it is the first request of a new cycle for a measurement/cell-search gap or a follow-up request. The reason for such a follow-up request may be to verify the upper-layer identification of the CSG cell 110 or to request a second gap be allocated to the WTRU 100.

Upon receiving a request for a measurement/cell-search gap allocation, which may contain a first request indication by setting a bit, the network 105 may allocate a first measurement/search gap. The WTRU 100 may be configured to then use this measurement/cell-search gap to try and search for suitable CSG cells 110 in the vicinity. The WTRU 100 may be configured to search for specific PCIDs corresponding to CSG cells 110 to which it has access. Specifically, it may be configured to search for PCIDs corresponding to the CSG cells 110 in its CSG cell white-list 230. The WTRU 100 may be configured to focus its search on certain frequency bands and/or center frequencies. The frequency and PCID information may be configured in the WTRU 100, or may be indicated to the WTRU 100 by the network 105 in its measurement/cell-search gap allocation message. The WTRU 100 may be configured to obtain upper layer identification, such as the CSG ID or the CSG TA ID, of the cell carried on downlink (DL) broadcast channels. The WTRU 100 may be configured to do so only for those cells whose PCIDs and/or frequency information match those configured for the CSG cell white-list 230 to which the WTRU 100 has access to. The WTRU 100 may be configured to make a measurement, such as a reference signal received power (RSRP), of a particular cell that it detects. The WTRU 100 may be configured to do so only for those cells whose PCIDs and/or frequency information match those configured for the CSG cell white-list 230 for which the WTRU 100 has access to.

The WTRU 100 may be configured to request another measurement/cell-search gap. This request may include an indication of a follow-up request, (e.g., by means of a bit). Any request for a measurement/cell-search gap may contain a bit which either indicates whether this is a first request or a follow-up, (i.e., secondary), request. The WTRU 100 may be configured to send this follow-up request if at least one of the following conditions is met:

1) If the WTRU 100 determines that it has detected a cell whose frequency information and/or PCID matches that of a CSG cell 110 that is on its CSG cell white-list 230. This determination may have been made in a prior measurement/cell-search gap.
2) If the WTRU 100 needs a gap to acquire the broadcast information, (e.g., MIBs or SIBs), of a particular CSG cell 110 in order to unambiguously identify it as a CSG cell that it has access to and belongs on its CSG cell white-list 230.
3) If measurements were made on detected cells satisfy or exceed predetermined criteria. These measurements may have been only on detected cells whose frequency information and/or PCID matches that of a CSG cell 110 that is on the CSG cell white-list 230 of the WTRU 100.
4) If the WTRU 100 needs a gap to make a measurement on a detected cell. This criteria may be invoked only if measurements are to be made on a cell whose frequency information and/or PCID matches that of a CSG cell 110 that is on its CSG cell white-list 230.
5) If the WTRU 100 had not finished detecting all the cells on the bands/center frequencies that may contain a CSG cell 110 to which it has access.
6) If the WTRU 100 detects a collision of PCIDs amongst detected cells. This may apply only if at least two cells for which collision is detected have the same frequency information as that of a CSG cell 110 on the CSG cell white-list 230 of the WTRU 100. Additionally or alternatively, this may apply only if the PCID for which collision is detected matches that of a CSG cell 110 on the CSG cell white-list 230 of the WTRU 100. This collision determination may have been made in a prior measurement/cell-search gap.

The WTRU 100 may be configured to detail the above mentioned conditions in its request to the network 105. The WTRU 100 may be configured to keep requesting measurement/search gaps until it has finished performing some or all of the above procedures. In particular, the WTRU 100 may be configured to indicate to the network 105 if a collision of PCIDs was observed and optionally the scale of collision, for example, identical PCIDs matching that of a CSG cell 110 in the CSG cell white-list 230 detected. If the WTRU 100 uses PCIDs in its search for CSG cells 110, and it finished detecting all cells that are available on the bands/frequencies that may contain a CSG cell 110 it has access to, and it does not detect the PCID of a CSG cell 110 that is configured in its CSG cell white-list 230 in the first round of searching, then it may stop the current cycle of measurement/cell-search gap allocation requests without requesting another measurement/cell-search gap. If the WTRU 100 stops the current cycle of CSG cell search, and if the current cycle was initiated by a manual cell search command, the WTRU 100 may indicate to the user, for example by means of an application, that no CSG cells 110 to which the user has subscribed were detected. If the WTRU 100 stops the current cycle of CSG cell search, and the current cycle was initiated by WTRU autonomous detection of a CSG cell 110 in the vicinity of the WTRU 100, the WTRU 100 may choose not to search/evaluate the conditions for searching for CSG cells 110 for at least a predetermined period of time. After the predetermined period of time has elapsed, the WTRU 100 may evaluate the conditions for triggering an autonomous CSG cell search again, (e.g., using GPS coordinates or surrounding cell and/or TA IDs). With each successive failure of WTRU autonomous CSG cell search, the value of the predetermined period of time may change, (e.g., it may increase). The length of the predetermined period of time may be configured by the network 105.

If the WTRU 100 sends another request for a measurement/cell-search gap allocation, which may optionally contain a follow-up request indication, then the network 105 may configure the WTRU 100 with another measurement/cell-search gap. This gap may be longer than the first gap. During this gap, the WTRU 100 may perform measurements, such as RSRP measurements, on the PCIDs that were detected earlier. During this gap, the WTRU 100 may acquire broadcast information, such as SIBs and MIBs, of the cells using the PCIDs that were detected earlier. Optionally, the WTRU 100 may be configured to make measurements of only those cells whose PCID and/or frequency information matches that of a CSG cell 110 configured in its CSG cell white-list 230. Optionally, the WTRU 100 may be configured to acquire the broadcast information of only those cells whose PCID and/or frequency information matches that of a CSG cell 110 in its CSG cell white-list 230. Additionally or alternatively, the WTRU 100 may be configured to acquire the broadcast information of only those cells whose measurements, (e.g., RSRP), meet some criteria. Upon acquiring the broadcast information, the WTRU 100 then preferably makes a final determination on whether it has access to the CSG cell 110, for example, by matching the broadcast CSG identifier with that in its CSG cell white-list 230. Alternatively, a new ID which is smaller than the TA could be defined which can be signaled on the MIB or SIB. This new ID can be derived from TA or the cell ID. Once the WTRU 100 reads the L1 cell ID and determines it is part of the CSG cell white-list 230, the WTRU 100 preferably can just read the MIB or SIB to make the cell unique and avoid collisions, thereby avoiding the need to read all the SIBs of the HNB cells to which the WTRU 100 decides to reselect. The reading of MIB/SIB by the WTRU 100 can be done in the same measurement gap as the reading of the L1 cell IDs or in a second measurement gap.

If the above described procedures were initiated because of a manual CSG cell search command by the user, the WTRU 100 preferably notifies the user, for example by means of an application, of any CSG cells 110 that are in the vicinity, that are of an acceptable quality and to which the user has access. The notification preferably includes identification of the CSG cell 110 to the user.

If the user manually selects a CSG cell 110 that is presented to the user, in the case of a suitable CSG cell 110 being detected by a WTRU autonomous procedure, the WTRU 100 preferably requests a handover to the appropriate CSG cell 110 from the network 105. The request may take the form of a notification or an event report. The request may be included in any RRC message.

Alternatively a new RRC message called an RRC event notification message is proposed that includes this notification. The notification preferably includes the identity of the CSG cell 110 that is manually or autonomously selected. The identity may be at least one of the CSG identifiers configured in the CSG cell white-list 230, a PCID and an HeNB ID. In addition the notification may include a measurement of the selected cell. The measurement value may be the real measured value or artificially set to some predefined value, such as the highest possible value, to force the network 105 to handover the WTRU 100.

If the user initiates a manual CSG cell search/selection procedure while the WTRU 100 is in an active mode, and at any point the network 105 refuses to configure the WTRU 100 with a measurement/cell-search gap that the WTRU 100 needs in order to perform the procedures described above or refuses the handover request, then the WTRU 100 may indicate a failure to search for CSG cells 110 to the user. This indication may explain the cause to the user, such as the WTRU 100 cannot perform search currently, or the network 105 refused the handover request. If the refusal by the network 105 indicated a cause value, then the WTRU 100 may provide this cause value to the user. The WTRU 100, possibly under command from the network 105, may be configured to request the user to re-initiate the search at a later instant. This request may include a time indication for re-initiation, (e.g., five minutes or at 4:00 PM).

If the WTRU 100 initiated an autonomous CSG cell search/selection procedure while the WTRU 100 is in an active mode, and at any point the network 105, refuses to configure the WTRU 100 with a measurement/cell-search gap that the WTRU 100 needs in order to perform the procedures described above or refuses the handover request, then the WTRU 100 may choose not to search/evaluate the conditions for searching for CSG cells 110 for at least a predetermined period of time. After the predetermined period of time has elapsed, the WTRU 100 may evaluate the conditions for triggering an autonomous CSG cell search again, such as GPS coordinates, or surrounding cell/TA IDs. With each successive failure of the WTRU autonomous CSG cell search, the length of the predetermined period of time may change, (e.g., increase). The length of the predetermined period of time may be configured by the network 105.

If the user initiates a manual CSG cell search/selection procedure while the WTRU 100 is in an active mode, and at any point the WTRU 100 moves to an idle mode, then the WTRU 100 may indicate a failure to search for CSG cells 110 to the user. This indication may explain the cause to the user being a move to an idle mode. The WTRU 100, possibly under command from the network, may be configured to request the user to re-initiate the search at a later instant. This request may include a time indication for re-initiation. Alternatively the WTRU 100 may be configured to automatically start applying idle mode procedures for CSG cell search.

If the user initiates a manual cell search or if the WTRU 100 determines that the conditions for autonomous CSG cell search are met, (e.g., GPS coordinates), while the WTRU 100 is in the process of making an emergency call, the above procedures may be disregarded, (i.e., not performed). In this case, the WTRU 100 may notify the user of the failure to search because of an ongoing emergency call.

Idle Mode Mobility

In an idle mode, the WTRU 100 may be configured to search for CSG cells 110 either because it received a manual search command from the user or it autonomously detected that the conditions for triggering a CSG cell search were met, for example GPS coordinates, surrounding cell/TA ID, or timer expiry. In an idle mode, the WTRU 100 is preferably configured to perform at least one of the following:

1) Use its receiver 210 to detect PCIDs of available cells, where the WTRU 100 may search for only specific PCIDs in the frequency band/center frequency that is configured for CSG cells 110 to which it has access.

2) Make a measurement, for example RSRP measurement, on the cells detected, where the WTRU 100 may make measurements only on those cells whose PCID and/or frequency information matches those of a CSG cell 110 in its CSG cell white-list 230.

3) Evaluate if the measured value of the cell satisfies the suitable cell measurement, such as signal strength or quality criteria, for cell selection or cell re-selection to CSG cells 110.

4) Acquire broadcast information, such as MIBs, SIBs, of the CSG cells 110, and ensure that the broadcast CSG identifier, (e.g., CSG TA ID), matches an entry in the CSG cell white-list 230 to which the WTRU 100 has access. The WTRU 100 may perform this step only for those cells whose PCID and/or frequency information matches those of a CSG cell 110 in its CSG cell white-list 230, and/or whose measurement value satisfies the suitable cell measurement, (i.e., signal strength/quality), criteria for cell selection or re-selection to CSG cells 110. The WTRU 100 is preferably allowed to read the broadcast information of the neighboring cells while it stays on the current cell before it reselects a cell. In this way, the WTRU 100 does not have to reselect to a given cell to read its SIBs and determine the white-list of cells. Alternatively, a new ID which is smaller than the TA can be defined, and may be signaled on the MIB or SIB1. This new ID can be derived from TA or the cell ID. Once the WTRU 100 reads the L1 cell ID and determines if it is part of the CSG cell white-list 230, the WTRU 100 can just read the MIB or SIB1 to make the cell unique and avoid collisions, thereby avoiding the need to read all the SIBs of the HNB cells to which the WTRU 100 decides to reselect.

The above procedures may be modified in an idle mode if the WTRU 100 cannot find a suitable CSG cell 110 or macro-cell 115, and is looking for an acceptable cell to use for emergency access. Alternatively the following procedures may be performed.

1) The WTRU 100 may search for more than certain PCIDs/bands/frequency information.

2) Alternatively, the WTRU 100 may make measurements on all cells detected, and not just those CSG cells 110 whose PCID and/or frequency information matches those of a CSG cell 110 in its CSG cell white-list 225.

3) Alternatively, the WTRU 100 may acquire the broadcast information of all CSG cells 110 detected, and not just those CSG cells 110 whose PCID and/or frequency information matches those of a CSG cell 110 in the CSG cell white-list 230, as long as the measured value of these cells satisfies the acceptable cell measurement criteria for cell selection or re-selection to CSG cells 110.

Mobility detection, including counting of cells or any other method that is defined, may not work best for the WTRU 100 when reselecting to an HNB cell considering the size of a HNB cell. Hence, when the WTRU 100 is reselecting to an HNB cell, an additional factor for speed based detection may be signaled. This parameter is preferably called the speed parameter for HNB. For example, if the method being used is cell counting, then the speed parameter for HNB can add a scaling factor to the number of cells that need to be counted to determine a high or medium mobility scenario.

Alternatively, network based speed detection schemes may be used when the WTRU 100 is handed over to an HNB.

Alternatively, if the WTRU 100 detects that it is in a mobility scenario, it may be configured to perform a random access channel (RACH) procedure by moving to a connected state and performing a handover, where the network 110 could take care of further procedures.

Outbound CSG to Macro-Cell Mobility

If the WTRU 100 is currently camped on a CSG cell 110, the WTRU 100 may store macro-cell parameters 235 associated with at least one macro-cell 115 that the WTRU 100 last camped on or was connected to before it was re-selected/handed over to the current CSG cell. The original re-selection or handover from the macro-cell 115 to the CSG cell 110 may have been triggered by any cause, for example a manual request or a WTRU autonomous search. The parameters of the last macro-cell(s) 115 the WTRU 100 chose to remember may include at least one of the following: frequency band, center frequency, physical cell ID (PCI), cell global ID (CGI), and TA ID. When in an idle mode, if the WTRU 100 detects that it is leaving the coverage area or has lost coverage of the current CSG cell, the WTRU 100 may prioritize re-selection to the macro-cell(s) 115 stored as the last cell(s). Accordingly, the WTRU 100 may be configured to choose to do at least one of the following: measure the last macro-cell(s) first, measure the centre-frequency of the last macro-cell(s) first, measure on the frequency layer of the last macro-cell(s) first, and prioritize re-selection to the last macro-cell.

Detection and Measurement of CSG Cells

A procedure for detection and measurement of CSG cells will now be described, where it is assumed that the WTRU 100 is camped on a macro cell 115 and there are surrounding CSG cells which are provided for coverage extension. In such a scenario when the serving cell goes below a particular threshold, the WTRU 100 sends a report to the serving cell informing it that the serving cell has gone below an absolute threshold, (configured by the network 105). The threshold for starting a CSG cell search and identification procedure may be different than one used for a regular intra-frequency/inter-frequency/inter-RAT measurements.

Presence of Intra-Frequency Neighbors

The WTRU 100 may, in parallel, measure the surrounding neighbor cells on the same frequency and, once it finds a certain set of neighbor cells which are above a threshold, (configured by the network 105), the WTRU 100 may report the neighbor cell PCI to the network 105 arranging the neighbor cells in the order of the serving signal strength in the measurement report. This threshold may be different for a cell having a PCI that belongs to the PCI space reserved for CSG cell use, than for a cell which is not using such a PCI.

If the WTRU 100 detects a cell, the WTRU 100 may read the MIB and SIB to make sure the upper layer identity of the CSG cell 110, (e.g., a GCI or CGI, which includes a public land mobile network (PLMN) identity plus the cell identity and/or the eNB/HeNB identity), is present in the CSG cell white-list 230 if at least one of the following conditions are met 1) the PCI of the detected cell belongs to a PCI space reserved for CSG cells 110;
2) the PCI of the detected cell is configured in the WTRU 100;
3) the detected cell is above a certain threshold; or
4) the WTRU 100 has at least one entry in its CSG cell white-list 230 of upper-layer identities.

To read the upper-layer identity of the neighbor cell, the WTRU 100 may first determine whether it has a DRX gap which is enough to read the neighbor cell's MIB and SIB. If the DRX gap is long enough, it could use the DRX gap to read the MIB and SIB.

If DRX gap is not long enough to read MIB and SIB of the neighbor cell, the WTRU 100 may either request a measurement gap from the network 105, or the WTRU 100 may tune away autonomously to read MIB and SIB of the neighbor cell.

To request a measurement gap from the network, the WTRU 100 may send a measurement report with a bit/flag indicating that the measurement report being sent is for requesting a gap to read the upper-layer identification of the neighbor cell. Alternatively, or as an addition to measuring the surrounding neighbor cells as described above, when the WTRU 100 sends a report to the network 105 indicating the neighbor cells, it may set a flag/bit indicating to the network 105 that it needs a gap to measure the MIB, SIB and, if required, other SIBs of the neighboring CSG cells 110.

Alternatively, the WTRU 100 may always tune away autonomously or request a measurement gap from the network 105 to read the MIB and SIB of the neighbor cell, irrespective of whether it has a DRX cycle or not.

To decide when to tune away and create its own gap, the WTRU 100 may be provided a threshold for the serving cell and/or the neighbor cell. The WTRU 100 may then tune away when the serving cell is below a threshold and/or the neighbor cell is above a particular threshold. The thresholds may be configured by the network 105 either through RRC signaling, (through dedicated messages or in the system information), or through MAC or L1 signaling. Additionally, even if the neighbor cell is above a particular threshold or the serving cell is below a particular threshold, it may be specified that the WTRU 100 may only tune away to read the neighbor CSG cell upper-layer identification only if the PCI of the CSG cell is part of its PCI list.

Alternatively, the WTRU 100 may only tune away and create its own gap when it receives a signal from the network 105 allowing it do so. This signal may be sent to the WTRU 100 either as an L1, MAC or RRC signal. Alternatively, or in addition, the WTRU 100 may not even read the CSG cell MIB or SIB, even if it has a long enough DRX cycle, unless the network 105 sends it an L1, MAC or RRC signal allowing it to do so. In such cases, the network 105 may decide that the WTRU 100 does not need to read the upper-layer identification of the neighbor CSG cell since there may possibly be a macro-cell 115 to which it may still hand the WTRU 100 over.

To prevent a complete loss in synchronization with the network 105, the WTRU 100 may send a MAC signal to the network 105 which informs the network 105 that it is tuning away. Instead of MAC signaling, the WTRU 100 may generate L1 signaling. Alternatively, or in addition, the WTRU 100 may generate some kind of RRC signaling, (e.g., a measurement report), optionally with an indication informing the network 105 that it is tuning away to read the neighbor cell broadcast information.

When the WTRU 100 tunes away, it may tune away for a prolonged period of time until it finishes reading MIB and SIB, (and, if required, other system information messages), of the neighbor cell, or it may tune away for short predefined intervals of time with short gaps in between them and continue to do it. The length of the intervals for which WTRU 100 tunes away, and the gaps between the intervals, may be configured by the network 105 either through dedicated RRC signaling or through broadcast messages, or may be defined in the specification. Alternatively, the WTRU 100 may decide it autonomously. Alternatively, or as an addition, the WTRU 100 may report the length of time it is planning to tune away and/or and the gaps between the intervals in the MAC/L1/RRC signal it sends to the network 105. The length of the interval may be, as an example, in units of slots or frames. For example, in a MAC control element (CE) or in an RRC message, the WTRU 100 may report/specify the system frame number (SFN) and subframe number at which it will tune away. It may also specify the time, (e.g., the SFN and subframe number), at which it will tune back.

Once the WTRU 100 finishes reading the upper-layer identification of the neighboring CSG cell, and (optionally) if it finds that the CSG cell 110 is present in its CSG cell white list 230, the WTRU 100 reports this cell to the network 105 through a measurement report or through any other RRC signaling. The WTRU 100 may report at least one of the physical cell identity or the upper-layer identification of the CSG cell 110. Alternatively, or as an addition, the WTRU 100 may also report a bit/flag in its measurement report which may indicate to the network 105 that the measurement report being sent either has some extra information, or that the WTRU 100 is now requesting a handover command through this measurement report. Still alternatively, instead of utilizing an additional flag, this can be associated with, or implied from the measurement identity (MeasId) included in the report.

Once the WTRU 100 receives the handover command from the network 105, the WTRU 100 may move on to the particular CSG cell 110 or any other cell to which the network 105 commands it to move.

Absence of Intra-Frequency Neighbors:

If none of the cells in the current frequency are available, the WTRU 100 may send a measurement report to the network 105 indicating that there are no neighbor cells which are above a particular threshold. As a possible addition, the WTRU 100 may set a bit in this measurement report requesting a gap from the network 105 to measure the inter-frequency cells. Along with this gap, if the WTRU 100 believes that there are surrounding CSG cells 110, the WTRU 100 may possibly also set a flag/bit requesting for gaps that are also long enough to read the MIB/SIB of the CSG cell 110.

Alternatively, the WTRU 100 may also autonomously create a gap or use its DRX to perform measurements of inter-frequency cells or possibly only autonomously create a gap when the DRX cycle is not enough to do so or when it does not have a DRX cycle at all.

The WTRU 100 measures the inter-frequency neighbor cells and sends a report to the network 105 listing the neighbor cells in signal strength priority order. Alternatively, if the WTRU also reads the upper-layer identification of the neighboring CSG cells along with measuring the neighboring inter-frequency cells, the WTRU 100 may just send a measurement report including a request for a handover command.

Once the WTRU 100 receives the handover command from the network 105, the WTRU 100 moves to that particular CSG cell 110 or any other cell, to which the network 105 commands it to camp on.

For the above description, mention for both intra-frequency and inter-frequency neighbors, the network 105 may possibly configure the WTRU 100 to either autonomously tune away or to request a measurement gap or to use its DRX gap to perform the neighbor cell measurements in case of an inter-frequency scenario or to read the neighbor CSG cell upper-layer identification in the case of both intra and inter-frequency scenarios.

Minimizing Service Degradation and/or Packet Loss

When the WTRU 100 autonomously tunes away from its serving eNB or cell, (e.g., to perform measurements or verify PCI or GCI), service degradation and/or packet loss may occur since the serving eNB may schedule traffic to the WTRU 100 which is not received. If the time taken to perform autonomous tuning away or gap creation by the WTRU 100 is long enough, this may also lead to triggering the reset or re-establishment criteria, (e.g., by radio link control (RLC)), which may lead to further packet loss.

In order to minimize service degradation, the WTRU 100 may decides to autonomously tune away, the WTRU 100 sends a signal to the serving eNB to indicate to the serving eNB that it will or may autonomously tune away. The signal may be an RRC message or information element (IE), or a MAC CE. Alternatively, the signal may be a flag/bit in the measurement report sent from the WTRU 100 to the serving eNB. For example, when the WTRU 100 sends a measurement report to the network 105 indicating the neighbor cells, the WTRU 100 will set a flag/bit indicating to the network 105 that it is planning to tune away, (e.g., to measure the MIB, SIB and, if required, other SIBs of the neighbor HNB cells). Once the eNB receives the signal, the eNB may suspend the scheduling of downlink traffic, (and also potentially uplink traffic, if needed), to the WTRU 100. Alternatively, the eNB may speed up the scheduling of downlink traffic before the WTRU 100 tunes away, (i.e., in response to this signal, the eNB will affect its traffic scheduling to such WTRU 100 in a way that it deems the most suitable). The signal may optionally include any one or more of the following:

1) Cause for traffic suspension request, or reason for tuning away;
2) Time, (e.g., SFN and/or subframe number), at which the WTRU 100 will tune away; and/or
3) Time, (e.g., SFN and/or subframe number), at which the WTRU 100 will tune back.

Alternatively, the maximum WTRU tune-away time may be (pre-)defined as a parameter in an RRC message or IE, (e.g., either the WTRU 100 will send/inform the network 105 its maximum autonomous tune-away time parameter, or the network 105 will inform the WTRU 100 of the maximum autonomous tune-away time parameter).

The WTRU 100 may optionally wait for an acknowledgment from the serving eNB before it actually tunes away. The acknowledgment may be any one or more of the following:

1) A response signal, (e.g., an RRC message or IE, or a MAC CE sent by the serving eNB in response to that sent from the WTRU 100;
2) A hybrid automatic repeat request (HARQ) acknowledgement (ACK) on the HARQ protocol data unit (PDU) that carried the WTRU's signal;
3) An RLC-level acknowledgement (i.e. RLC Status Report) acknowledging the RLC PDU that carried the WTRU's signal, (in case an RRC message/WTRU is used as the signal). If the WTRU 100 receives such an acknowledgment, the WTRU 100 will then proceed with the tune-away from the serving eNB.

Optionally, if the WTRU 100 tunes back, (e.g., after completing its measurements or verifying PCI or GCI), the WTRU 100 sends another signal to the serving eNB. Such a signal may be an RRC message or IE, or a MAC CE. Such a signal indicates to the serving eNB that the WTRU 100 has tuned back and hence is ready to receive traffic.

Structure of the WTRU's Measurement Report

According to the 3GPP specifications, if the measurement report sent by the WTRU 100 includes multiple cells, and a measurement quantity is not provided for each cell, the WTRU measurement report will include the cells in order of decreasing quantity, (i.e., the best cell is included first).

For HeNB cells, either the same approach as currently specified by 3GPP can be followed, or the HeNB cell(s) can be identified by via a specific order or location within the measurement report. As one example, the first cell reported in the measurement report may be the WTRU's HeNB cell, (regardless of the value of the measurement quantity, as long as such quantity is acceptable above a suitable threshold). The approach in which the HeNB cells can be identified by via a specific order is preferred over the approach as specified by 3GPP because it allows the WTRU preference for its HeNB cell(s) to be indicated within the measurement report.

In general, certain types, (or all), of the WTRU's measurement reports will be ordered in accordance to the WTRU's preferences, (e.g., handover preference). For example, the WTRU measurement report will include the cells in order of decreasing preference, (i.e. the most preferred cell is included first). In the case where the WTRU 100 prefers to be handed over to HeNB cell(s), this will be reflected in the measurement report, and hence, the serving eNB will try to prioritize handover in accordance to the WTRU preference.

Figure 3:
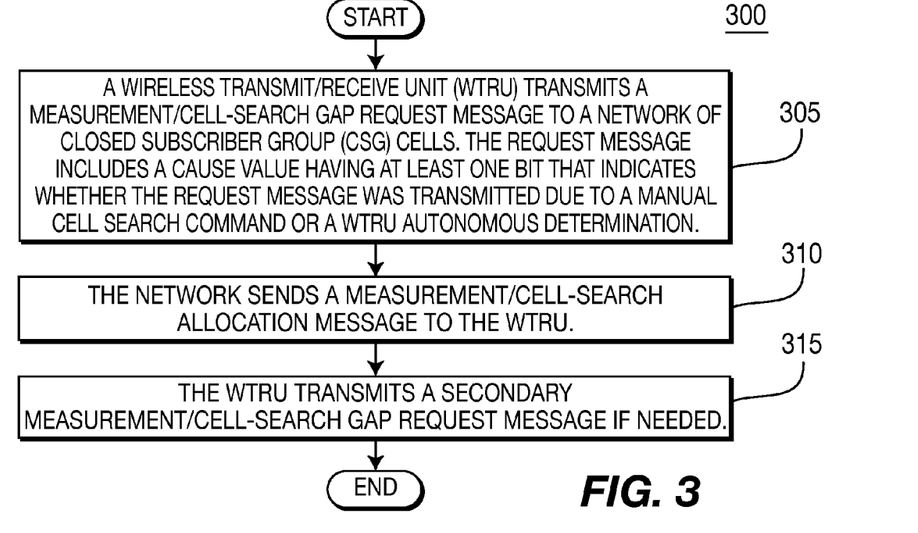
FIGS. 3-6 are flow diagrams of various procedures for searching for CSG cells.

FIG. 3 is a flow diagram of a procedure 300 for searching for CSG cells. Referring to FIGS. 1-3, the transmitter 220 in the WTRU 100 is configured to transmit a measurement/cell-search gap request message via the antenna 205 to the network 105 of CSG cells 110. The request message includes a cause value having at least one bit that indicates whether the request message was transmitted due to a manual cell search command or a WTRU autonomous determination (step 305). In step 310, the network 105 sends a measurement/cell-search allocation message to the receiver 210 of the WTRU 110, which is configured to receive the allocation message via the antenna 205. The WTRU 100 may transmit a secondary measurement/cell-search gap request message, if needed (step 315).

Figure 4:
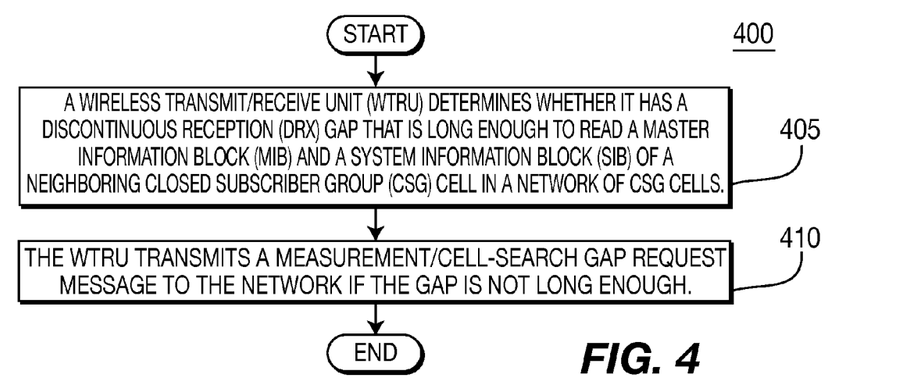

FIG. 4 is a flow diagram of a procedure 400 for searching for CSG cells. Referring to FIGS. 1, 2 and 4, the processor 215 in the WTRU 100 is configured to determine whether it has a DRX gap that is long enough to read a MIB and an SIB of a neighboring CSG cell 110 (step 405). The transmitter 220 in the WTRU 100 is configured to transmit a measurement/cell-search gap request message on the condition that the DRX gap is not long enough (step 410).

Figure 5:
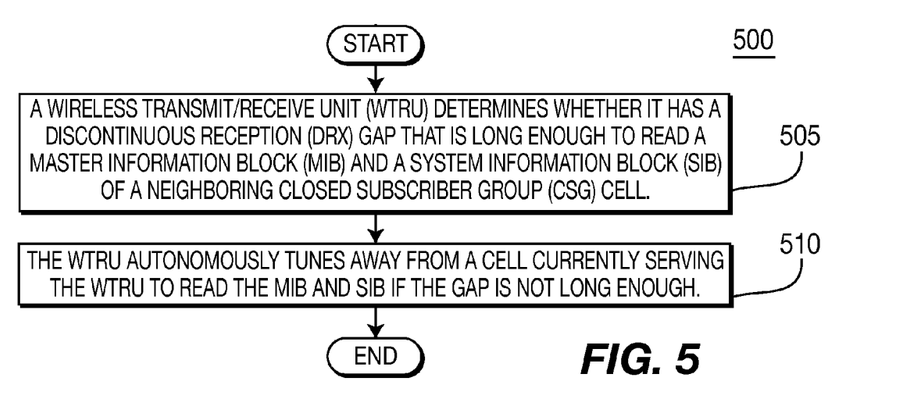

FIG. 5 is a flow diagram of a procedure 500 for searching for CSG cells. Referring to FIGS. 1, 2 and 5, the processor 215 in the WTRU 100 is configured to determine whether it has a DRX gap that is long enough to read a MIB and an SIB of a neighboring CSG cell 110 (step 505). The receiver 210 and the transmitter 220 in the WTRU 100 are configured to autonomously tune away from a cell currently serving the WTRU 100 to read the MIB and SIB on the condition that the DRX gap is not long enough (step 510).

Figure 6:
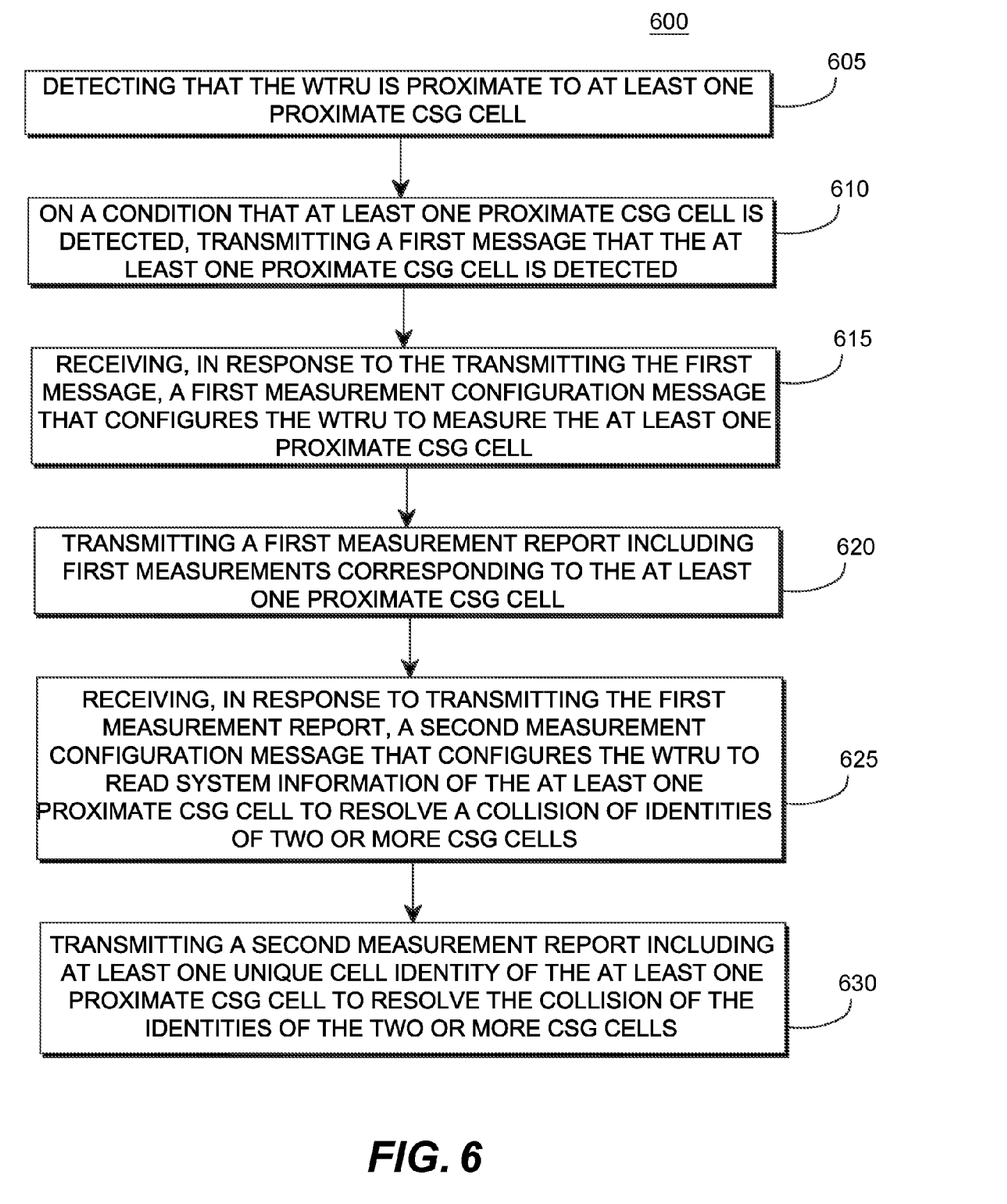

FIG. 6 is a flow diagram of a procedure 600 implemented by a WTRU for searching for CSG cells and resolving a collision of identities (e.g., PCIDs) amongst detected cells. The procedure 600 includes detecting, by the WTRU, that the WTRU is proximate to at least one proximate CSG cell (step 605) and, on a condition that at least one proximate CSG cell is detected, transmitting, by the WTRU, a first message that the at least one proximate CSG cell is detected (step 610). The procedure 600 further includes, in response to the transmitting the first message, receiving, by the WTRU, a first measurement configuration message that configures the WTRU to measure the at least one proximate CSG cell (step 615), and transmitting, by the WTRU, a first measurement report including first measurements corresponding to the at least one proximate CSG cell (step 620). The procedure 600 further includes, receiving, by the WTRU, in response to transmitting the first measurement report, a second measurement configuration message that configures the WTRU to read system information of the at least one proximate CSG cell to resolve a collision of identities of two or more CSG cells (step 625), and transmitting, by the WTRU, a second measurement report including at least one unique cell identity of the at least one proximate CSG cell to resolve the collision of the identities of the two or more CSG cells (step 630). The at least one unique cell identity may be acquired from read system information.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented by a wireless transmit/receive unit (WTRU) for searching for closed subscriber group (CSG) cells, the method comprising:
   detecting, by the WTRU, that the WTRU is proximate to at least one proximate CSG cell;
   on a condition that at least one proximate CSG cell is detected, transmitting, by the WTRU, a first message that the at least one proximate CSG cell is detected;
   in response to the transmitting the first message, receiving, by the WTRU, a first measurement configuration message that configures the WTRU to measure the at least one proximate CSG cell;

transmitting, by the WTRU, a first measurement report including first measurements corresponding to the at least one proximate CSG cell;

receiving, by the WTRU, in response to transmitting the first measurement report, a second measurement configuration message that configures the WTRU to read system information of the at least one proximate CSG cell to resolve a collision of identities of two or more CSG cells; and transmitting, by the WTRU, a second measurement report including at least one unique cell identity of the at least one proximate CSG cell to resolve the collision of the identities of the two or more CSG cells, wherein the at least one unique cell identity is acquired from the read system information.

2. The method of claim 1, wherein the second measurement report includes a CSG ID of the at least one proximate CSG cell and an indication of whether the CSG ID is included in a white list maintained by the WTRU.

3. The method of claim 1, wherein the first message includes a request for a measurement gap.

4. The method of claim 3, further comprising:
receiving a measurement gap indication message in response to the first message.

5. The method of claim 1, wherein the WTRU is in a connected mode and the second measurement report further includes a request for a handover command, the method further comprising:
receiving a second message in response to the second measurement report, the second message including a handover indication; and
performing a handover to one of the at least one proximate CSG cell in response to the handover indication.

6. The method of claim 1, further comprising:
transmitting a third measurement report in response to determining, by the WTRU, that the WTRU is leaving a coverage area of a CSG cell.

7. The method of claim 1, wherein the detecting that the WTRU is proximate to the at least one proximate CSG cell includes determining that a signal strength of the at least one proximate CSG cell is above a predetermined threshold.

8. The method of claim 1, wherein the second measurement configuration message indicates a physical layer identifier for each of the at least one proximate CSG cell for which the at least one unique cell identity is to be reported.

9. The method of claim 1, wherein the first measurement configuration message configures the WTRU to measure CSG cells on a frequency of the at least one proximate CSG cell.

10. The method of claim 1 further comprising:
responsive to the second measurement configuration message, reading the system information of the at least one proximate CSG cell during a period selected autonomously by the WTRU.

11. The method of claim 10 further comprising:
receiving permission to autonomously select the period to read the system information of the at least one proximate CSG cell; and
wherein the reading of the system information of the at least one proximate CSG cell is responsive to the permission.

12. A wireless transmit/receive unit (WTRU) for searching for neighboring closed subscriber group (CSG) cells, the WTRU comprising:

a processor configured to determine that the WTRU is proximate to at least one proximate CSG cell;

a transmitter configured to transmit a first message on a condition that the processor determines that the WTRU is proximate to the at least one to proximate CSG cell, the first message including an indication that the at least one proximate CSG cell is proximate to the WTRU;

a receiver configured to receive, in response to the transmitting the first message, a first measurement configuration message that configures the processor to measure the at least one proximate CSG cell;

the transmitter configured to transmit a first measurement report that includes first measurements corresponding to the at least one proximate CSG cell;

the receiver further configured to receive, in response to the first measurement report being transmitted, a second measurement configuration message that configures the WTRU to read system information of the at least one proximate CSG cell to resolve a collision of identities of two or more CSG cells; and the transmitter further configured to transmit a second measurement report including at least one unique cell identity of the at least one proximate CSG cell to resolve the collision of the identities of the two or more CSG cells, wherein the at least one unique cell identity is acquired from the read system information.

13. The WTRU of claim 12, wherein the second measurement report includes a CSG ID of the at least one proximate CSG cell and an indication of whether the CSG ID is included in a white list maintained by the WTRU.

14. The WTRU of claim 12, wherein the first message includes a request for a measurement gap.

15. The WTRU of claim 14, wherein the receiver is further configured to:
receive a measurement gap indication message in response to the first message.

16. The WTRU of claim 12, wherein the WTRU is in a connected mode and the second measurement report further includes a request for a handover command, and
the receiver is further configured to receive a second message in response to the second measurement report, the second message including a handover indication; and
the processor, the transmitter, and the receiver are further configured to perform a handover to one of the at least one proximate CSG cell in response to the handover indication.

17. The WTRU of claim 12, wherein the transmitter is further configured to:
transmit a third measurement report in response to the processor determining that the WTRU is leaving a coverage area of a CSG cell.

18. The WTRU of claim 12, wherein the processor, the receiver, and the transmitter are further configured to determine that the WTRU is proximate to the at least one proximate CSG cell by determining that a signal strength of the at least one proximate CSG cell is above a predetermined threshold.

19. The WTRU of claim 12, wherein the second measurement configuration message indicates a physical layer identifier for each of the at least one proximate CSG cell for which the at least one unique cell identity is to be reported.

20. The WTRU of claim 12, wherein the first measurement configuration message configures the WTRU to measure CSG cells on a frequency of the at least one proximate CSG cell.

21. The WTRU of claim 12 wherein the receiver is further configured to read the system information of the at least one proximate CSG cell responsive to the second measurement configuration message during a period selected autonomously by the WTRU.

22. The WTRU of claim 21 wherein the receiver is further configured to receive permission to autonomously select the period to read the system information of the at least one proximate CSG cell, and wherein the receiver is configured to read the system information of the at least one proximate CSG cell on condition of receiving the permission.

* * * * *

UNITED STATES PATENT AND TRADEMARK OFFICE
CERTIFICATE OF CORRECTION

PATENT NO. : 9,913,206 B2
APPLICATION NO. : 12/406562
DATED : March 6, 2018
INVENTOR(S) : Shankar Somasundaram et al.

Page 1 of 1

It is certified that error appears in the above-identified patent and that said Letters Patent is hereby corrected as shown below:

In the Specification

- At Column 3, Line 62, change "1151" to --$115_1$--.
- At Column 3, Line 62, change "1152." to --$115_2$.--.
- At Column 11, Line 25, change "(Measld)" to --(MeasId)--.

Signed and Sealed this
Twenty-fifth Day of September, 2018

Andrei Iancu
*Director of the United States Patent and Trademark Office*